Nov. 1, 1938.  R. V. HOVE  2,135,077
FLOOR LIME SPREADER
Filed Oct. 8, 1936

INVENTOR.
Robert V. Hove.
BY A. S. Kroh.
ATTORNEYS.

Patented Nov. 1, 1938

2,135,077

UNITED STATES PATENT OFFICE 2,135,077

FLOOR LIME SPREADER

Robert V. Hove, Capron, Ill.

Application October 8, 1936, Serial No. 104,601

3 Claims. (Cl. 275—2)

My invention relates to means for spreading lime over the floors of barns, coops and the like, wherein it is desirable to completely and evenly cover the floor after being cleaned, with a thin film of lime or other powdered material for disinfecting and other purposes.

An object of the present invention is to lay the desired amount of lime on the floor in closely spaced small amounts and wipe it evenly over the entire surface in one operation, without creating dust in the room.

I accomplish these objects by means of a simple device and in one operation, in a manner which will hereinafter appear.

To these and other useful ends my invention consists of parts and combinations thereof or their equivalents, as hereinafter set forth and claimed and shown in the accompanying drawing in which:

As thus illustrated numeral 10 designates the cylinder or lime holder of the device, and 11 the end walls of the cylinder. Member 10 is provided with a multiplicity of small spaced orifices 9. Flanges 12 are on the periphery of members 11 and have a slightly larger diameter than member 10 for a purpose which will hereinafter appear.

Figure 2:
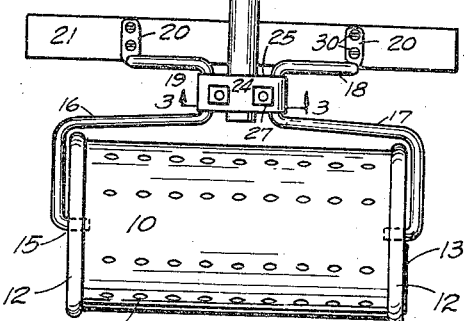
Fig. 2 is a top view of the device.

A door 13 having hinges 14 is provided on one of the end members whereby lime may be easily placed in the cylinder. The door hinges may be supplied with coiled springs which will act to hold the door normally in its closed position, or some other means may be provided for this purpose. Members 11 are provided with sleeves 15 having orifices suitable for the free reception of the inturned ends of frame rods 16 and 17 as illustrated by dotted lines in Figure 2.

Members 16 and 17 are formed as illustrated each have short parallel portions near their centers, terminating in downwardly and outwardly extending bars 18 and 19, each having at their ends rearwardly extending flattened portions 20—20, to which a brush 21 is secured by means of suitable screws 30, the brush having suitable bristles 22.

Figure 1:
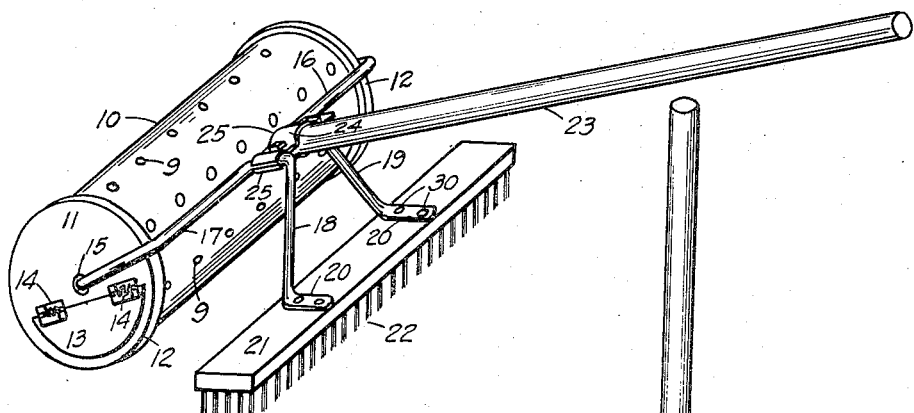
Fig. 1 is an isometric drawing of my device.
Figure 3:
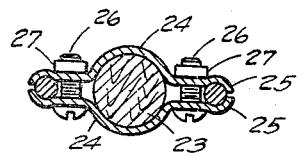
Fig. 3 is a sectional view taken on line 3—3 of Figure 2.

I provide a handle 23 and two clasps 24—24, suitably shaped to fit over the frame bars and handle as illustrated in Figure 3. I securely bind these parts together by means of bolts 26; thus it will be seen that when nuts 27 are made fast, the structure will be rigidly bound together and that by loosening bolts 26, the handle may be removed and replaced or rods 16 and 17 may be spread at the forward ends far enough to release the cylinder. If however, it is desired to disassemble the entire device, it is only necessary to remove bolts 26 and screws 30. Clearly bars 16 and 17 may be made from flat stock, in which case the forward ends may be rotatably supported to the drum by means of a long bolt passing through the drum.

Thus it will be seen that any part of the device may be easily removed and replaced and that the device may be placed on end and conveniently filled with lime.

The operation of the device is as follows: The rear end of handle 23 is grasped by the operator and the device pushed forward, the drum riding on flanges 12 and the bristles 22 of the brush riding on the floor. As the drum or cylinder is turned a small portion of lime will be deposited on the floor from each lower orifice, the turning movement acting to stir the lime in the cylinder and cause it to pass or sift through the orifices when passing near the floor. As the device is pushed forward the brush will act to evenly spread the lime over the surface of the floor and wipe it into every minute depression thus to treat or cover the entire surface with a thin film of lime or any other suitable material.

A novel feature of my device is flanges 12. Floors being treated may be damp and these flanges prevent the drum from contacting the floor and thus the drum and contents will be kept dry and clean. Clearly the operator may by manipulating the handle, move the brush over the floor with the drum lifted slightly and therefore not in operation; or the drum may be operated while the brush is not in contact with the floor. Generally, however, the operator simply pushes the device across the floor with the brush in contact therewith until the entire surface has been covered with lime. Obviously this may be done without filling the room with lime dust because of the close proximity of the orifices to the floor when the lime is released, and the slow movement of the bristles of the brush over the floor; and further, the use of my device results in considerable saving of time and material and insures a better distribution than is possible in any other known manner.

Having thus shown and described my invention, I claim:

1. A device of the class described, comprising a tube having a multiplicity of spaced orifices therein and end headers having peripheral flanges and centrally positioned orifices, and frame bars having inwardly extending front ends adapted to be loosely engaged by said central orifices, said frame bars extending inwardly adjacent said tube and each being secured to a socket which is adapted for the reception of the front end of an operator's handle, said bars extending downwardly and outwardly from said socket and having a floor brush secured thereto, said flanges having a greater diameter than said tube, whereby a portion of the contents of said tube is free to drop from said orifices when adjacent the floor.

2. A device of the class described, comprising a tube having a multiplicity of evenly spaced orifices and end members each having a centrally positioned orifice, frame bars having their front ends turned inwardly and adapted to be loosely embraced by said central orifices, said bars extending inwardly near said tube, then rearwardly for a short distance and then downwardly and outwardly terminating in rearwardly extending ends and having a floor brush secured thereto, a handle and means adapted to removably secure the front end of said handle to said rearwardly extending portions.

3. A device of the class described, comprising a drum having therein a multiplicity of spaced orifices and end headers, said headers having circular peripheral flanges adapted to act as carrying means for said drum, end bars being pivotally secured at their front ends to the centers of said headers and having secured thereon to their rear ends a floor brush being positioned parallel to and adjacent said drum, said bars having a rearwardly and upwardly extending handle secured thereto, whereby said drum and brush may be simultaneously or individually pushed or pulled while in contact with the floor.

ROBERT V. HOVE.